Patented June 25, 1940

2,205,481

UNITED STATES PATENT OFFICE 2,205,481

MONOAZO DYESTUFFS

Herbert Kracker and Willy Schumacher, Frankfort-on-the-Main, Germany, assignors to General Aniline & Film Corporation, a corporation of Delaware No Drawing. Application September 1, 1939, Serial No. 293,055. In Germany September 8, 1938

5 Claims. (Cl. 260—198)

The present invention relates to monoazo dyestuffs, more particularly to dyestuffs of the following general formula

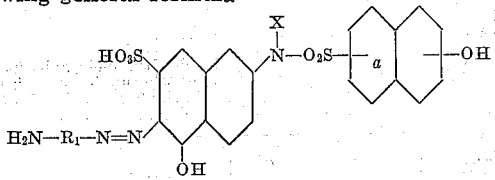

wherein X stands for hydrogen, alkyl or aryl and $R_1$ for an aryl radical and wherein the naphthalene nucleus $a$ may contain further substituents.

We have found that industrially valuable monoazo dyestuffs are obtained by combining the diazo-compound of an aromatic amine containing a nitro-group or of a mono-acylated aromatic diamine, in an acetic acid medium with a compound of the general formula

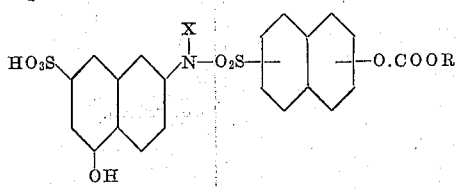

wherein X stands for hydrogen, alkyl or aryl and R for alkyl and wherein the naphthalene nucleus containing the carboxylic acid ester group may contain further substituents, splitting off the carboxylic acid ester group from the monoazo dyestuff obtained, which does not contain an amino-group capable of being diazotised, and reducing the nitro-group or saponifying the monoacyl-amino-group.

The new dyestuffs thus obtained are suitable for dyeing wool and cotton, especially for dyeing mixed fabrics from wool and artificial silk staple fibre in a neutral or feebly acid bath.

The dyestuffs in which the diazotisable amino-group does not stand in ortho-position to the azo group yield especially fast dyeings if the dyestuff is diazotised on the fibre and coupled with itself by addition of an agent that neutralises the acid or has an alkaline action.

The dyestuffs containing in the portion carrying the amino-group in ortho-position to the azo group a radical capable of forming a metal complex compound, for instance, a hydroxyl, alkoxy- or carboxyl-group, may be improved with respect to their properties of fastness by after-treating them on the fibre with a copper or a chromium salt.

The azo components used in the present process may be obtained, for instance, by condensing the corresponding carboalkoxynaphtholsulpho-chloride with 2-amino-5-hydroxy-napthalene-7-sulphonic acid or the derivative substituted in the amino-group by alkyl or aryl, for instance, 2-methyl-amino-, 2-phenylamino, 2-(4'-methoxyphenyl)-amino- or 2-(4'-hydroxy-3'-carboxyphenyl)-amino-5-hydroxynaphthalene-7-sulphonic acid.

The carboalkoxynaphtholsulphochlorides may be obtained as described by Zincke (Berichte der Deutschen Chemischen Gesellschaft, vol. 51, page 354) from the corresponding naphtholsulphonic acids.

The following example illustrates the invention, the parts being by weight, unless stated otherwise; the parts by weight and the parts by volume are related to each other as are kilograms to litres:

257 parts of 2-amino-5-hydroxynaphthalene-7-sulphonic acid of 94 per cent strength are dissolved at 70° C. to 80° C. in 2500 parts by volume of water and the quantity of sodium carbonate necessary for neutralization and to this solution there are added in portions in a vessel provided with a good stirrer 340 to 350 parts of 2-carboethoxynaphthol-7-sulphochloride in such a way that when the reaction of the liquid begins to become acid to Congo-paper an aqueous sodium acetate solution of about 20 per cent strength is added until the acid reaction to Congo has disappeared. Stirring is continued at 70° C. to 80° C. until the reaction to aminonaphtholsulphonic acid has completely disappeared. Into this solution there is run at 0° C. to 3° C., while stirring, a diazo-solution prepared in the usual manner from 203 parts of 4-chloro-5-nitro-2-amino-1-methoxybenzene, care being take by the simultaneous addition of sodium acetate that the mixture is constantly acid with acetic acid. When the coupling is finished, the azo dyestuff formed is salted out by means of sodium chloride and filtered with suction; the solid matter is washed with a sodium chloride solution of about 5 per cent strength and made into a paste by stirring it with about 7500 parts by volume of water; by addition of 150 parts by volume of caustic soda solution of 37.5 per cent strength the whole is rendered alkaline, stirred for 1 hour at 45° C. to 50° C., a solution of 390 parts of crystallized sodium sulphide in 600 parts by volume of water is added and the whole is further stirred for about 1 hour at 50° C. to 55° C. The solution obtained is filtered, cautiously acidified by means of hydrochloric acid and, after cooling, the precipitated dyestuff is filtered with suction and washed with a small quantity of water. The reduced paste is purified by dissolving it at 50° C. to 60° C. in 5000 parts by volume of water and the necessary quantity of caustic soda solution and filtered. From the filtrate the amino-monoazo dyestuff thus purified is precipitated by means of hydrochloric acid, pressed and dried. In the dry state it is a blue-black powder, probably of the following formula:

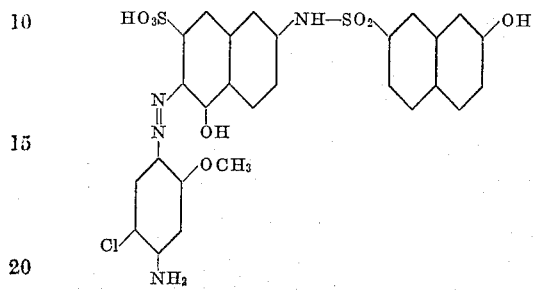

The dyestuff dyes wool, artificial silk staple fibre and mixed fabrics from wool and artificial silk staple fibre violet even tints. By diazotisation on the fibre and after-treatment in a feebly alkaline medium, dark navy blue tints are obtained. By a subsequent treatment with a copper or chromium salt especially the fastness to light and to washing of the navy blue dyeings obtained may be further enhanced.

The same dyestuff may be obtained by using instead of 2-carboethoxynaphthol-7-sulphochloride the 2-carbomethoxynaphthol-7-sulphochloride or instead of 4-chloro-5-nitro-2-amino-1-methoxybenzene the 4-chloro-5-acetamino-2-amino-1-methoxybenzene.

By exchanging the aforesaid dyestuff components for other diazo or azo components of the composition described, dyestuffs of similar properties are obtained.

The following table illustrates a number of further monoazo dyestuffs obtainable by the invention as well as the shades obtained with these dyestuffs:

| Constitution of the dyestuff | Shade of the dyeings obtained by self-coupling on mixed fabrics from wool and artificial silk staple fibre |
|---|---|
| (1) | Currant. |
| (2) | Do. |
| (3) | Covered red. |
| (4) | Violet-brown. |
| (5) | Covered red. |
| (6) | Do. |
| (7) | Reddish Bordeaux red. |
| (8) | Bordeaux to garnet. |

| Constitution of the dyestuff | Shade of the dyeings obtained by self-coupling on mixed fabrics from wool and artificial silk staple fibre |
|---|---|
| (9) | Bluish red. |
| (10) | Dark blue. |
| (11) | Do. |
| (12) | Black violet. |
| (13) | Currant. |
| (14) | Turbid yellow red. |
| (15) | Reddish navy blue. |
| (16) | Reddish dark red-brown. |
| (17) | Reddish dark blue. |
| (18) | Navy-blue. |

| Constitution of the dyestuff | Shade of the dyeings obtained by self-coupling on mixed fabrics from wool and artificial silk staple fibre |
|---|---|
| (19) | Currant. |
| (20) | Covered red. |
| (21) | Currant. |
| (22) | Scarlet. |
| (23) | Dull currant. |
| (24) | Reddish dark blue. |
| (25) | Dark blue. |
| (26) | Dark violet. |
| (27) | Dark violet blue. |
| (28) | Covered red. |

| Constitution of the dyestuff | Shade of the dyeings obtained by self-coupling on mixed fabrics from wool and artificial silk staple fibre |
|---|---|
| (29) 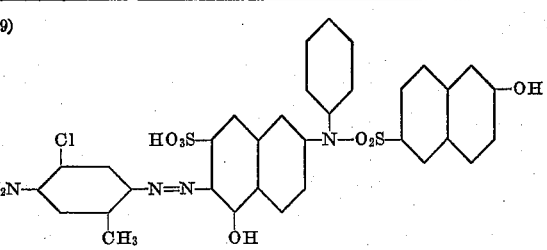 | Violet black. |

We claim:
1. The monoazo dyestuffs of the following general formula

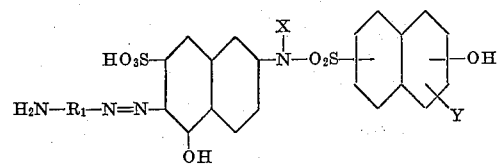

wherein $R_1$ means a radical of the benzene series, X stands for a member of the group consisting of hydrogen, methyl and phenyl, and Y for a member of the group consisting of hydrogen and halogen, dyeing the fiber red to blue black shades and yielding scarlet to dark blue dyeings of very good fastness properties if the dyestuff is diazotized on the fiber and coupled with itself by addition of an agent that neutralizes the acid or has an alkaline action.

2. The monoazo dyestuffs of the following general formula

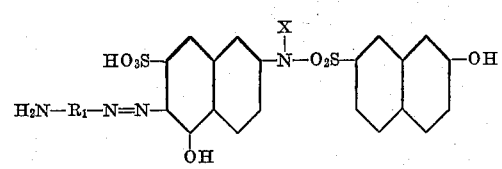

wherein $R_1$ means a radical of the benzene series, and X stands for a member of the group consisting of hydrogen, methyl and phenyl, dyeing the fiber red to blue black shades and yielding scarlet to dark blue dyeings of very good fastness properties if the dyestuff is diazotized on the fiber and coupled with itself by addition of an agent that neutralizes the acid or has an alkaline action.

3. The monoazo dyestuff of the formula

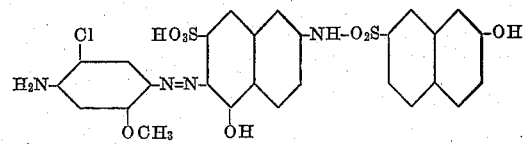

dyeing wool, artificial silk staple fiber and mixed fabrics from wool and artificial silk staple fiber violet even tints and yielding by diazotization on the fiber and after-treatment in a feebly alkaline medium dark navy-blue tints whose fastness to light and to washing may be enhanced by a subsequent treatment with a copper or chromium salt.

4. The monoazo dyestuff of the formula

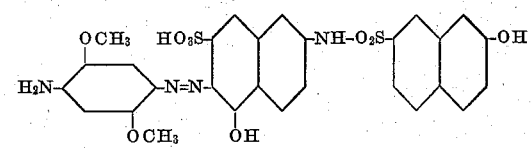

yielding by diazotization on mixed fabrics from wool and artificial silk staple fiber and after-treatment in a feebly alkaline medium dark blue dyeings of very good properties of fastness.

5. The monoazo dyestuff of the formula

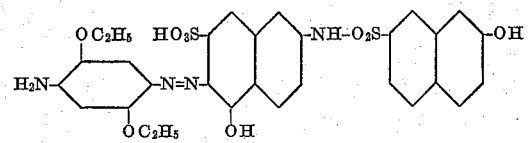

yielding by diazotization on mixed fabrics from wool and artificial silk staple fiber and after-treatment in a feebly alkaline medium dark blue dyeings of very good properties of fastness.

HERBERT KRACKER.
WILLY SCHUMACHER.